No. 656,988. Patented Aug. 28, 1900.
J. D. MAGEE.
COMBINED HARROW AND CULTIVATOR.
(Application filed Jan. 12, 1900.)
(No Model.) 2 Sheets—Sheet 1.
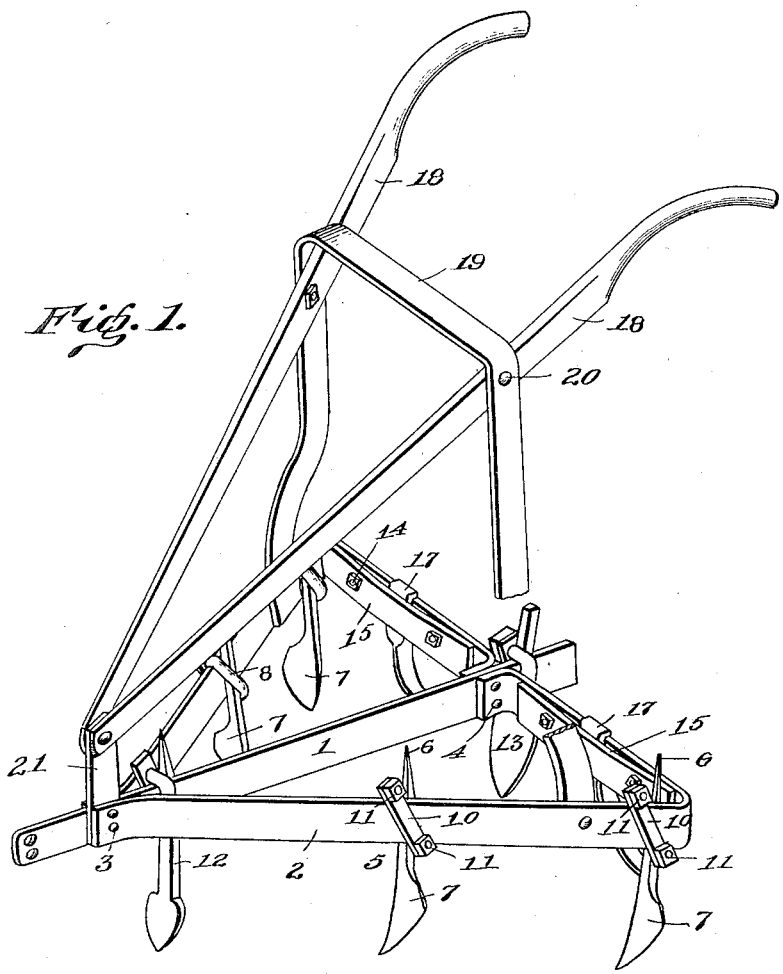
Fig. 1.
Fig. 2.
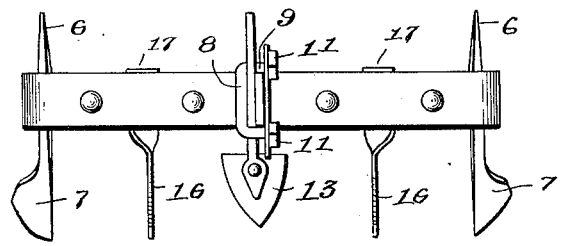
Witnesses
Inventor
Jefferson D. Magee
By James L. Norris
Attorney No. 656,988. Patented Aug. 28, 1900.
J. D. MAGEE.
COMBINED HARROW AND CULTIVATOR.
(Application filed Jan. 12, 1900.)
(No Model.) 2 Sheets—Sheet 2.

Witnesses:

Inventor
Jefferson D. Magee
By James L. Norris
Attorney.

THE NORRIS PETERS CO., PHOTO-LITHO., WASHINGTON, D. C.

UNITED STATES PATENT OFFICE.

JEFFERSON D. MAGEE, OF BASSFIELD, MISSISSIPPI.

COMBINED HARROW AND CULTIVATOR.

SPECIFICATION forming part of Letters Patent No. 656,988, dated August 28, 1900.

Application filed January 12, 1900. Serial No. 1,244. (No model.)

*To all whom it may concern:*

Be it known that I, JEFFERSON D. MAGEE, a citizen of the United States, residing at Bassfield, in the county of Covington and State of Mississippi, have invented new and useful Improvements in a Combined Harrow and Cultivator, of which the following is a specification.

My invention relates to certain improvements in a combined harrow and cultivator, my object being to provide a harrow which can be quickly and easily converted into a cultivator or from the latter into a harrow.

It is a further purpose of my invention to provide a harrow of simple and economical construction having teeth which can be reversed end for end to adapt it to perform work of different kinds, such as breaking up heavy soil, applying fertilizing compounds, making and planting garden-beds, and cultivating cereals and vegetables. In this connection it is my object also to provide means whereby the teeth of a harrow or a suitable number of such teeth can be utilized to cut up clods or sod or to sever roots and running vines in breaking up new land.

Finally, I aim by my invention to provide a convertible harrow the teeth of which when reversed to perform the functions of cultivator shovels or plows may be set at any required angle to the line or direction in which the harrow is moving, where the soil may be turned inward or from both sides of the plow toward its central longitudinal line.

My invention also comprises other novel and useful features, all of which will be fully described in the following specification and then specifically pointed out and defined in the claims.

For the purpose of the following description reference is had to the accompanying drawings, in which—

Figure 3:
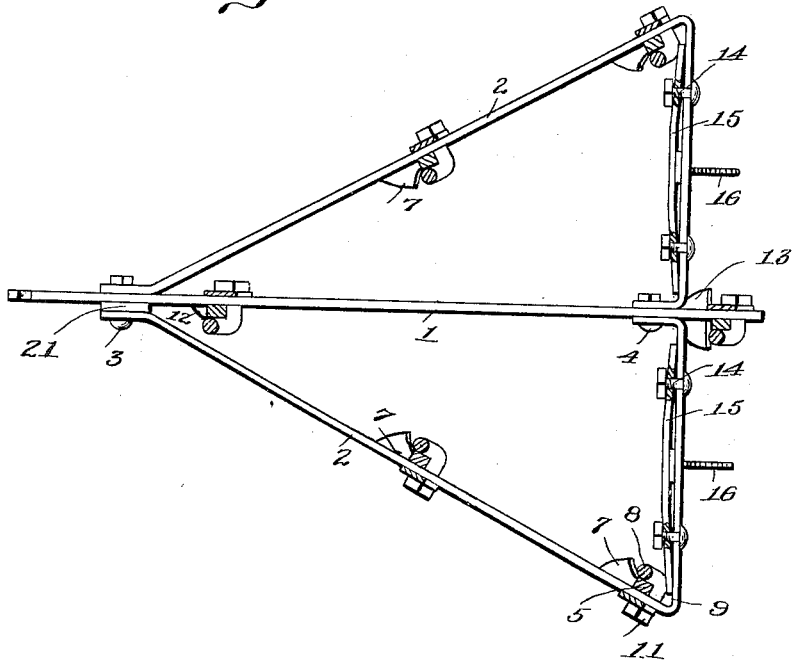
Figure 4:
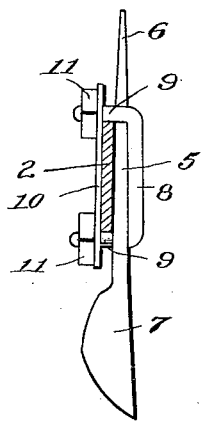

Figure 1 is a perspective view showing a convertible harrow constructed in accordance with my invention. Fig. 2 is a rear elevation showing the manner of attaching the knives and a central cultivator-shovel to the rearward member of the frame of the harrow. Fig. 3 is a cross-section upon the line 3 3 in Fig. 2. Fig. 4 is a detail section showing the manner of attaching the teeth to the side bars of the harrow, their reversibility, and the construction by which said teeth can be adjusted at different angles.

Referring to the drawings, the frame of my implement is shown as comprising a triangular structure consisting of a central drag-bar 1, having bent metallic straps 2 secured thereto at front and rear. The straps 2 when bent into shape and secured to the central drag-bar each form, in connection with the latter, a right-angled triangle, and the two sides of the frame combined form an isosceles triangle. As shown, the straps 2 are secured to the central drag-bar at their forward ends by bolts 3 and at their rear ends by bolts 4.

The teeth of the harrow consist of bars 5, tapered at one end to a sharp point, as 6, and at the other end formed into or provided with shovels or plow-blades 7. The said teeth are detachably secured to the sides 2 of the frame by means of yokes 8, which are disposed transversely upon the inner sides of said frame in an inclined direction, the ends 9 of said yokes projecting laterally across the upper and lower edges of the side bars, to which they are attached. The shanks or bars 5 are passed between said yokes and the corresponding sides of the frame and are disposed vertically against the face of the frame and the adjacent yoke. A flat clamping-plate 10, having perforations near its ends to receive the ends of the yoke, is arranged against the outer surface of the frame, and nuts 11 are screwed upon the ends of the yokes which project through said openings and are threaded to receive the nuts. The inclination of the yoke 8 lies in a plane extending from the upper edges of the side straps 2 downward and rearward, so that one of the ends lies in front of the upper end of each tooth, while the other end lies behind said tooth in position to sustain the rearward thrust of the latter. The central tooth 12 at the apex of the frame is mounted on the central drag-bar in a manner similar to that described in connection with the teeth above described.

Upon the rear end of the central drag-bar 1 is secured a shovel-plow 13, attached to said drag-bar in the same manner as the cultivator-teeth before described. Bolted to the inner side of said rear end of the frame by bolts 14 are two metallic straps 15, between which and said frame are arranged the ends of knives or blades 16, the shanks of which are adapted to be clamped between the rear end of the frame and the straps 15 and the upper ends 17 of which are preferably bent rearwardly at right angles to overlap the rear end of the frame, as shown. By loosening the bolts 14 the knives or blades may be removed, replaced, or adjusted toward one another, and the shovel-plow 13 may also be removed or replaced at will.

Plow-handles 18 are connected to the frame by means of an upright yoke 19, the ends of which are bolted to the frame and pass over the handles and are secured thereto by bolts 20. The forward ends of the handles are disposed upon the opposite sides of an upright bracket 21, which is secured to the central drag-bar by the bolts 3.

When the implement is to be used as a harrow, the teeth 5 are secured to the frame so that their pointed ends 6 project downward and engage the soil after the usual manner of harrow-teeth. The knives 16 operate to cut up clods and the like, while the central shovel-plow 13 operates to open the soil for planting. When used as a cultivator, the shovel-plows when turned outward, as shown in Fig. 1, operate to turn the soil outward or away from the central line of draft preparatory to making the bed or for cultivating growing plants; but in making the bed the shovel-plows are interchanged, so that the moldboards are turned inward or toward one another, and said plows then operate to turn the soil in toward the central line of draft and heap it up to form a bed.

What I claim as new, and desire to secure by Letters Patent of the United States, is—

1. In a combined harrow and cultivator, the combination with a triangular frame comprising a central drag-bar and two triangular metallic straps attached respectively at their forward and rear ends to said drag-bar and each having attached thereto cultivator-teeth, of cultivator-shovels carried by the rear end of said frame and each provided at its upper end with a flange overhanging the upper edge of the said rear end of the frame, and a metallic strap bolted to the rear end of the frame and operating to clamp the cultivator-shovels thereto, substantially as described.

2. In a combined harrow and cultivator, the combination with a triangular frame comprising a central drag-bar and two triangular metallic straps attached respectively at their forward and rear ends to the drag-bar and each carrying harrow-teeth and shovels, said drag-bar projecting beyond the rear end of said frame and having detachably connected thereto a combined harrow-tooth and shovel, substantially as described.

In testimony whereof I have hereunto set my hand in presence of two subscribing witnesses.

JEFFERSON D. MAGEE.

Witnesses:
  JOHN Q. BASS,
  T. A. HALL.